United States Patent [19]

Atherton

[11] Patent Number: 5,204,924
[45] Date of Patent: Apr. 20, 1993

[54] OPTICAL FIBRE REFLECTOR
[75] Inventor: Peter S. Atherton, Sydney, Australia
[73] Assignee: OTC Australia, Sydney, Australia
[21] Appl. No.: 761,333
[22] Filed: Sep. 17, 1991
[51] Int. Cl.$^5$ .......................... H01J 5/16; G02B 6/26; G02B 6/36
[52] U.S. Cl. ....................... 385/43; 359/322; 250/227.14
[58] Field of Search ............... 385/43, 39; 359/322; 250/227.14

[56] References Cited

U.S. PATENT DOCUMENTS

| | | | |
|---|---|---|---|
| 4,634,858 | 1/1987 | Gerdt et al. | 250/227 |
| 4,676,584 | 6/1987 | Perlin | 385/43 |
| 4,796,968 | 1/1989 | Coccoli et al. | 385/43 X |
| 4,867,518 | 9/1989 | Stamnitz et al. | 385/43 X |
| 4,973,122 | 11/1990 | Cotter et al. | 385/1 X |
| 4,991,926 | 2/1991 | Pavlath | 385/43 X |

*Primary Examiner*—Akm E. Ullah
*Attorney, Agent, or Firm*—Merchant, Gould, Smith, Edell, Welter & Schmidt

[57] ABSTRACT

An all-fibre mirror for use in fibre cavities and resinators for an all-fibre laser. The all-fibre mirror has a polarization selective fused taper optical fibre coupler including two pairs of optical fibres joined by a coupling region, with the fibres extending from one end of the coupling region being joined together so as to form a fibre loop. A polarization selection device interacts with the fibre loop to alter the polarization of the light passing through the loop.

12 Claims, 2 Drawing Sheets

OPTICAL FIBRE REFLECTOR

BACKGROUND OF THE INVENTION

The present invention relates to the use of optical fibres and more particularly to all-fibre reflectors, otherwise known as all-fibre mirrors.

A requirement sometimes encountered in optical fibre based devices is for the retro-reflection of light transmitted through a length of optical fibre. Traditionally this requirement has been met by using bulk optics, that is a mirror, and in some instances other optical devices, at the fibre end. The difficulties encountered with these previous methods have been (i) preparation of the fibre end,
(ii) precise alignment of the bulk optic components,
(iii) inefficiency of the overall reflection process due to optical losses, and
(iv) sheer size of the bulk optic device.

PRIOR ART

The above problems have been addressed in the past by using an all-fibre reflector otherwise known as an all-fibre mirror. Basically, the fibre mirror consisted of a standard four port fused taper fibre coupler with the two outward ports of the coupler connected together to form a continuous fibre loop. In the prior art the characteristics of the fibre coupler determine the reflectivity and transmissivity of the fibre mirror.

A disadvantage of the above discussed all-fibre mirror is that the transmissivity and reflectivity cannot be adjusted after manufacture to adapt the mirror to its specific working environment and requirements.

OBJECT AND SUMMARY OF THE INVENTION

It is the object of the present invention to overcome or substantially ameliorate the above disadvantages.

There is disclosed herein an all-fibre mirror including:

a polarisation selective fused taper optical fibre coupler portion consisting of two pairs of optical fibres joined by a coupling region with the fibres extending from one end of the coupling region being joined together so as to form a fibre loop; and a polarisation rotation device operatively associated with said fibre loop to alter the polarisation of the light passing through the loop.

BRIEF DESCRIPTION OF THE INVENTION

A preferred form of the present invention will now be described by way of example with reference to the accompanying drawings, wherein:

FIG. 1 is a schematic illustration of a polarisation selective coupler showing the basic characteristics of its operation;

FIGS. 2A-D are schematic illustrations of a polarisation selective optical fibre coupler in all four possible input modes of operation;

DESCRIPTION OF THE PREFERRED EMBODIMENT

Figure 1:
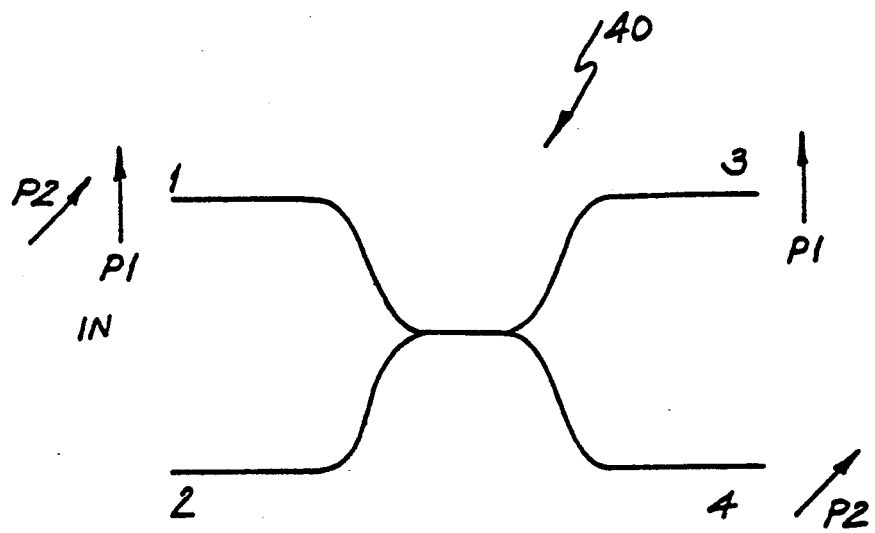
Figure 2A:
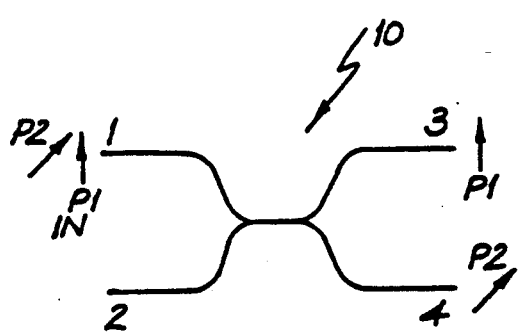
Figure 2C:
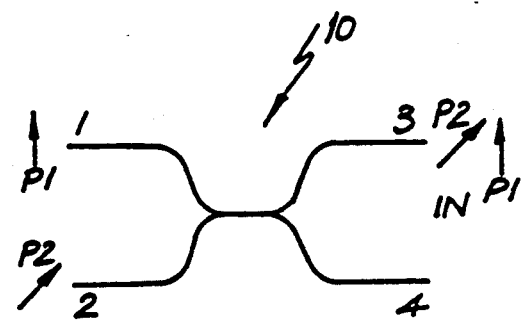
Figure 2B:
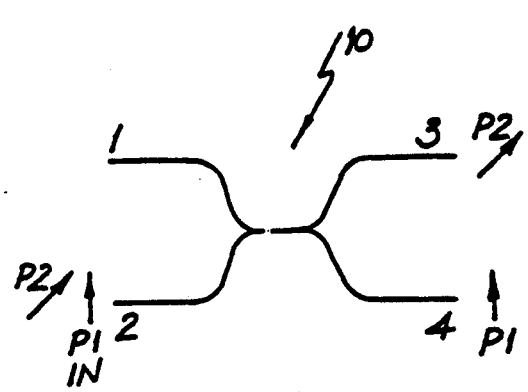
Figure 2D:
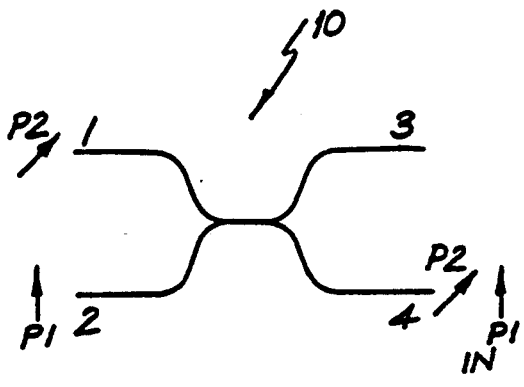

In FIG. 1 there is schematically depicted a polarisation selective optical fibre coupler 40 with four ports numbered 1 to 4, showing the behaviour of the coupler with light applied to port 1. The purpose of a coupler of this type is to separate two orthogonal polarisation states of the input light. If the input light applied to port 1 is divided into components having orthogonal polarisation states P1 and P2, where the particular orientations of P1 and P2 are governed by the design and fabrication of the coupler, then the component of the input light at port 1 having polarisation state P1 will emerge from the coupler at port 3 while the component of the input light having polarisation state P2 will emerge from the coupler at port 4.

In FIG. 2 there is schematically depicted a polarisation selective coupler 10 with light applied separately to each of the four ports of the coupler in order to illustrate the reciprocal nature of the behaviour of the polarisation selective coupler. In FIG. 2(A) input light is applied to port 1. The two orthogonal polarisation components P1 and P2 described above will emerge at output ports 3 and 4 respectively. Since the coupler is entirely symmetrical, input light delivered to port 2 will result in polarisations P1 and P2 emerging from the ports 4 and 3 respectively as shown in FIG. 2(B). If the input light is delivered to port 3 as shown in FIG. 2(C), then the polarisations P1 and P2 will emerge from the ports 1 and 2 respectively. In the case where input light is delivered to port 4 as shown in FIG. 2(D), the polarisations P1 and P2 will emerge from the ports 2 and 1 respectively.

Figure 3:
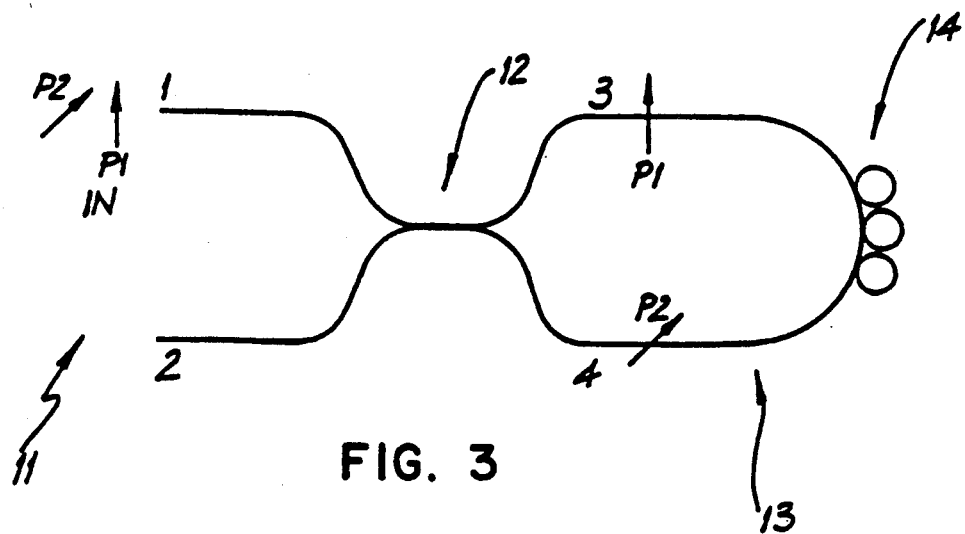
FIG. 3 is a schematic illustration of an all-fibre mirror.

In FIG. 3 there is schematically depicted the preferred embodiment of the all-fibre mirror 11 which is the subject of this invention. The fibre mirror 11 includes a polarisation selective coupler portion 12 having four ports numbered 1 to 4. In this particular example the ports 3 and 4 are joined so as to provide a loop 13.

The loop 13 is provided with a polarisation rotation device 14 which may be used to produce any desired polarisation rotation between 0° and 360°.

The purpose of the fibre reflector 11 is to reflect the input light delivered to the port 1 back along the input optical fibre. For example, if input light is injected into the port 1, then the polarisations P1 and P2 will emerge from ports 3 and 4 respectively. The P1 polarisation after passing through the device 14 would be rotated through 90° to be delivered to the port 4. As seen from FIG. 2(D) the rotated polarisation state would then be delivered from port 4 to port 1. In the case of the polarisation P2 emerging from port 4, it too would be rotated through 90° to enter port 3. As seen from FIG. 2(C) it also would be delivered to the port 1. Accordingly the light injected into port 1 is reflected back to port 1 if the device 14 is operated so as to rotate the polarisation of the light travelling through it by 90°.

Preferably the polarisation rotation device 14 would be adjustable in order to adjust the amount of light reflected to the port 1. The non-reflected light, that is the light transmitted via the all-fibre mirror, emerges from the port 2. Accordingly the device 14 can adjust the reflectivity and transmissivity of the fibre mirror 11.

Thus the device 11 acts as a fibre based mirror. By analogy injection of any polarisation state at any port will result in the reflected light exiting the mirror from the same port, if so adjusted.

Since the polarisation selective coupler, upon which the fibre mirror is based, is designed for operation only over a certain range of wavelengths, the fibre mirror will exhibit the complete range of reflectivities and transmissivities only over the same range of wavelengths. It should particularly be noted that the reflectivity, and hence also the transmissivity, of the fibre mirror can be adjusted between 0 and 100 percent by altering the amount of polarisation rotation between the arms 3 and 4 by adjustment of the device 14. For example, a polarisation rotation of 0° results in the reflectivity of 0 percent while a polarisation rotation of 90° or 270° results in a reflectivity of 100 percent. The power which is not reflected back along the input arm will exit the fibre mirror at the spare port 2. Hence the fibre mirror 11 can easily be adjusted to "tap off" a fraction of the power incident at port 1. This may be useful, for example in monitoring power levels.

It should be appreciated that the above described fibre mirror could be used as an end mirror for a fibre based laser. Still further, the mirror could be used as an end mirror on a fibre based external cavity for a semiconductor laser.

Figure 4:
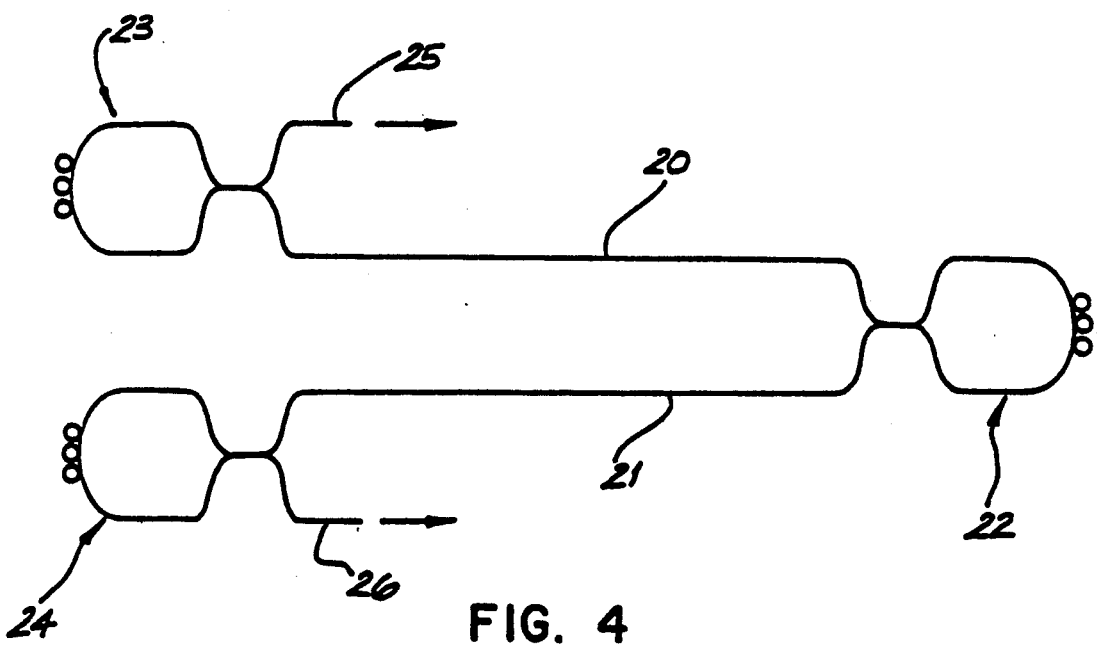
FIG. 4 is a schematic illustration of a combination including a pair of fibre cavities linked by the fibre mirror of FIG. 2.

In FIG. 4 there is schematically depicted a pair of fibre cavities 20 and 21 coupled by a fibre mirror 22. The mirror 22 being as discussed with reference to the mirror 11 of FIG. 3. Each of the cavities 20 and 21 would also be provided with a further mirror 23 or 24. The mirrors 23 and 24 would also be as discussed with reference to the mirror 11 of FIG. 3. In this configuration, coupling between the cavities 20 and 21 is achieved by altering the degree of polarisation rotation at the mirror 22. High reflectivity for both cavities 20 and 21 could only be achieved at mirror 22 for certain wavelength combinations. For example, high reflectivities could be achieved for cavities 20 and 21 operating at the same wavelength, provided this wavelength corresponds to the design wavelength of the basic polarisation selective coupler providing the mirror 22. The mirrors 23 and 24 are provided with outputs 25 and 26.

Figure 5:
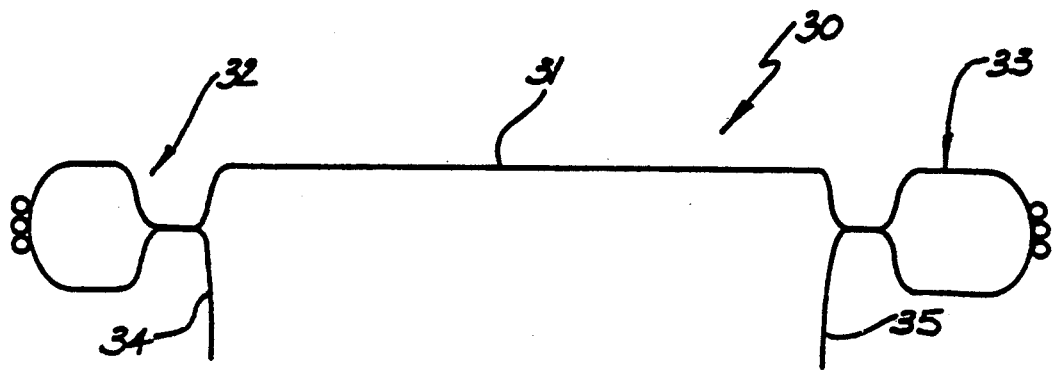
FIG. 5 is a schematic illustration of an all-fibre resonator.

In FIG. 5 there is schematically depicted an all-fibre resonator 30 which forms the basis of an all-fibre laser. The all-fibre resonator 30 includes a fibre cavity 31 terminating at its ends with fibre mirrors 32 and 33. The mirrors 32 and 33 would be as discussed with reference to the fibre mirror 11 of FIG. 3. The mirror 32 would be provided with an optical pumping port 34, while the mirror 33 would be provided with an output port 35. The reflectivity of the mirror 33 may be adjusted in order to determine the power exiting by the output port 35 and therefore enabling the establishment of optimum operating conditions for the all-fibre laser.

The above described preferred embodiment of the present invention overcomes the disadvantages of the prior art by utilising the polarisation property of the light to be reflected, whereas in the prior art the polarisation of the input light was not used in any way to achieve the reflection characteristic of the previous fibre mirrors. Hence the present invention in its preferred forms operates in a fundamentally different manner from the previous fibre mirrors.

What I claim is:

1. An all-fibre mirror including:
   a polarisation selective fused taper optical fibre coupler portion consisting of two pairs of optical fibres joined by a coupling region with the fibres extending from one end of the coupling region being joined together so as to form a fibre loop; and
   a polarisation rotation device operatively associated with said fibre loop to alter the polarisation of the light passing through the loop.

2. The all-fibre mirror of claim 1, further including a polarisation rotation device contained in said loop, to effect a polarisation rotation of between 0° and 360°.

3. The mirror of claim 2, wherein said device is adjustable in order to adjust the amount of light reflected from one of the joined fibres.

4. The mirror of claim 2, wherein said device effects a polarisation rotation of approximately 90°.

5. In combination, a pair of fibre cavities, and first, second and third all-fibre mirrors, each all-fibre mirror including:
   a polarisation selective fused taper optical fibre coupler portion consisting of two pairs of optical fibres joined by a coupling region with the fibres extending from one end of the coupling region being joined together so as to form a fibre loop; and
   a polarisation rotation device operatively associated with said fibre loop to alter the polarisation of the light passing through the loop; and wherein
   coupling first ends of the cavities are joined to first fibres of the first mirror, which first fibres do not form part of the loop of said first mirror, and the second and third fibre mirrors are each joined to a respective other end of the cavity by one of their fibres not forming their respective loop.

6. The combination of claim 5, wherein each fibre mirror includes a polarisation rotation device contained in its loop, to effect a polarisation rotation of between 0° and 360°.

7. The combination of claim 6, wherein each mirror is adjustable in order to adjust the amount of light reflected from one end of the fibres forming the loop.

8. The combination of claim 5, wherein each polarisation rotation device effects a polarisation rotation of approximately 90°.

9. An all-fibre resinator for an all-fibre laser, the resinator comprising a fibre cavity terminating at each end with an all-fibre mirror including:
   a polarisation selective fused taper optical fibre coupler portion consisting of two pairs of optical fibres joined by a coupling region with the fibres extending from one end of the coupling region being joined together so as to form a fibre loop; and
   a polarisation rotation device operatively associated with said fibre loop to alter the polarisation of the light passing through the loop; and wherein
   each fibre mirror being coupled to the cavity by one of its fibres which does not form its respective loop.

10. The all-fibre resinator of claim 9, wherein each fibre mirror includes a polarisation rotation device contained in its loop, to effect a polarisation rotation of between 0° and 360°.

11. The all-fibre resinator of claim 8, wherein each polarisation rotation device is adjustable in order to adjust the amount of light reflected from one end of its joined fibres.

12. An all-fibre resinator according to claim 10, wherein each polarisation rotation device effects a polarisation rotation of approximately 90°.

* * * * *